(12) United States Patent
Hall

(10) Patent No.: US 10,295,073 B2
(45) Date of Patent: May 21, 2019

(54) VALVE

(71) Applicant: AptarGroup, Inc., Crystal Lake, IL (US)

(72) Inventor: John Hall, Grand Rapids, MI (US)

(73) Assignee: AptarGroup, Inc., Crystal Lake, IL (US)

(*) Notice: Subject to any disclaimer, the term of this patent is extended or adjusted under 35 U.S.C. 154(b) by 0 days.

(21) Appl. No.: 15/304,223

(22) PCT Filed: May 14, 2014

(86) PCT No.: PCT/US2014/000097
§ 371 (c)(1),
(2) Date: Oct. 14, 2016

(87) PCT Pub. No.: WO2015/174950
PCT Pub. Date: Nov. 19, 2015

(65) Prior Publication Data
US 2017/0030472 A1  Feb. 2, 2017

(51) Int. Cl.
*B65D 47/20* (2006.01)
*F16K 15/14* (2006.01)
*F16K 21/04* (2006.01)

(52) U.S. Cl.
CPC ........ *F16K 15/147* (2013.01); *B65D 47/2031* (2013.01); *F16K 21/04* (2013.01)

(58) Field of Classification Search
CPC .......................... F16K 15/147; B65D 47/2031
USPC ......... 137/844, 849; 222/213, 492, 493, 494
See application file for complete search history.

(56) References Cited

U.S. PATENT DOCUMENTS

| 5,839,626 | A | 11/1998 | Gross et al. |
| 7,731,066 | B2 * | 6/2010 | Norris ................ B65D 47/2031 |
| | | | 222/490 |
| 2001/0025862 | A1 | 10/2001 | Brown et al. |
| 2008/0237271 | A1 | 10/2008 | Olechowski |
| 2008/0237278 | A1 | 10/2008 | Gaus et al. |
| 2009/0188950 | A1 * | 7/2009 | Gaus .................. B65D 47/2031 |
| | | | 222/494 |
| 2009/0212078 | A1 | 8/2009 | Gaus |

* cited by examiner

*Primary Examiner* — Marina A Tietjen
*Assistant Examiner* — Paul J Gray
(74) *Attorney, Agent, or Firm* — Wood, Phillips, Katz, Clark & Mortimer

(57) ABSTRACT

A flexible, resilient, self-sealing slit-type valve (40, 140, 240, 340) is provided with a configuration that minimizes the difference between the pressure differential at which the valve opens and the pressure differential at which the valve (40, 140, 240, 340) closes. The valve (40, 140, 240, 340) includes a peripheral mounting portion (42) and a valve head (60, 160, 260, 360) connected thereto. The valve head (60, 160, 260, 360) has an interior surface (78, 178, 278, 378) and an exterior surface (76) which each has a recessed configuration such that the thickness between the exterior surface (76) and interior surface (78, 178, 278, 378) is thinner at the center on the longitudinal axis (62) of the valve (40, 140, 240, 340) than at a radially outward location.

7 Claims, 11 Drawing Sheets

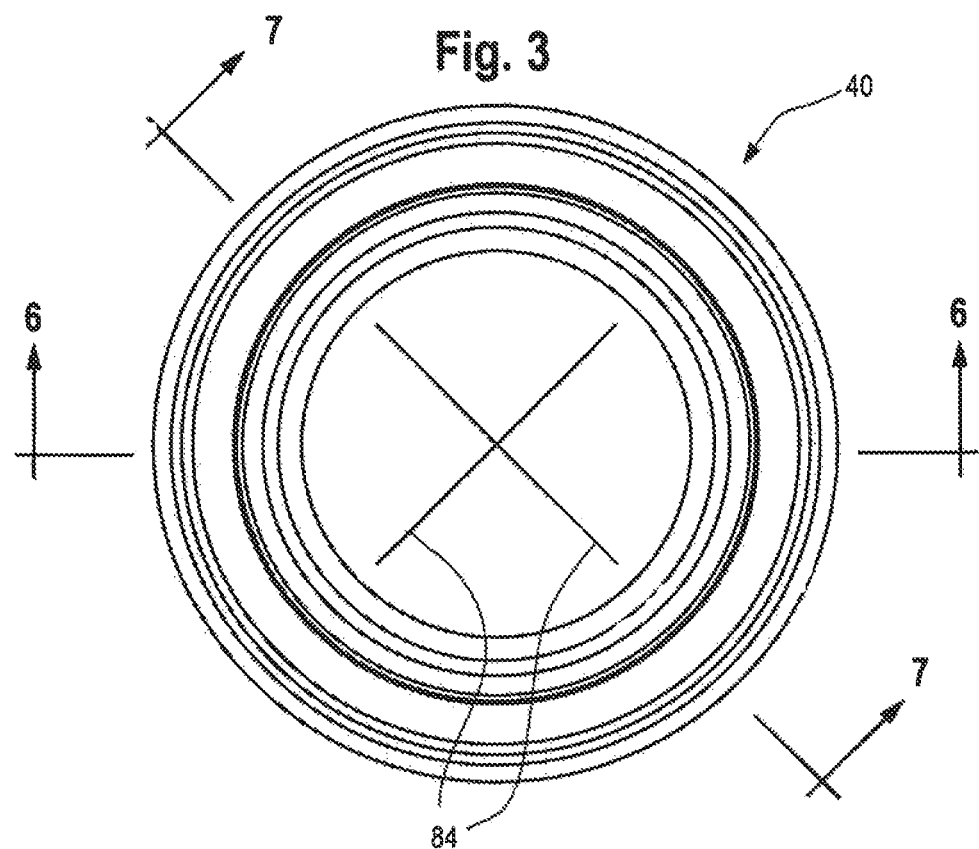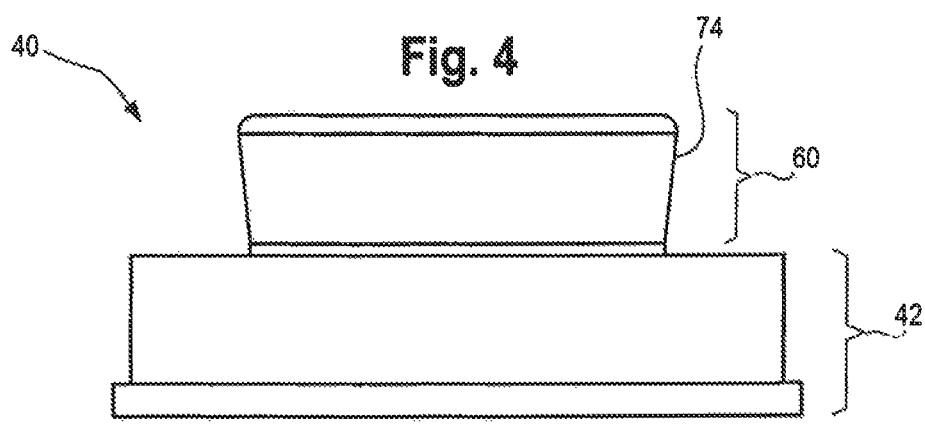

VALVE

TECHNICAL FIELD

The present invention relates generally to a flexible, resilient, self-sealing slit-type valve for accommodating the flow of the fluent substance through the valve when subjected to a sufficiently great pressure differential across the valve.

BACKGROUND OF THE INVENTION AND TECHNICAL PROBLEMS POSED BY THE PRIOR ART

A flexible, resilient, self-sealing (self-closing), slit-type valve has a slit or slits which define a normally closed orifice that opens to permit flow therethrough in response to an increased pressure differential across the valve (e.g., resulting from an increased pressure on one side of the valve, or from a reduced external ambient pressure compared to the pressure on the other side of the valve.). Such valves are typically designed so that they automatically close to shut off flow therethrough upon a reduction of the pressure differential across the valve.

A flexible, resilient, self-sealing, slit-type valve typically opens when subjected to a predetermined pressure differential across the valve that is sufficiently high for the particular valve design, and the valve closes when the pressure differential across the valve drops to some lower value. In valves of this type, the "opening" pressure differential is typically significantly greater than the valve closing pressure differential.

The inventor of the present invention has discovered that in some applications it can be desirable to minimize the difference between the pressure differential at which the valve opens and the pressure differential at which the valve closes. For example, the inventor has discovered that in certain applications involving the pumping of fluid through a system containing the valve, it would be desirable to have the valve closing pressure differential be only slightly less than the valve opening pressure differential—especially in anti-free flow applications wherein the valve is installed to function as an anti-free flow valve that must be initially opened by upstream pressure produced by the pump. The higher the pressure differential required to open the anti-free flow valve, the more energy it is required to operate the pump to open the valve and deliver the fluid. That greater energy requirement results in greater electric energy and power consumption (which more quickly draws down the charge on a battery if a battery is utilized to provide electric power).

In some applications it is desirable to minimize the energy consumption of the pump. For example, one such application is the use of in a pump-operated feeding set in a hospital environment for providing a nutritional fluid ("enteral formula") to a patient via tubing connected to the patient. A typical pump-operated feeding set includes (1) a suspended bag or bottle of enteral formula, (2) tubing extending from the bottom of the bag, (3) a pump cassette incorporating a pump acting on the tubing extending from the bottom of the bag so as to a meter (i.e., control) flow through the tubing from the bag at a desired flow rate (which is typically effected by adjusting the pump operation), and (4) tubing extending from the pump cassette to the patient. If a pump cassette were not provided to control flow through the tubing from the bag to the patient, the enteral formula would flow from the elevated bag through the tubing under the influence of the force of gravity and could not be easily controlled to a desired flow rate. A pump cassette interacting with the tubing can restrict the flow of enteral formula to a rate that is less than the free flow rate that would occur under the unrestricted gravity flow condition. The pump cassette can be adjusted to provide flow to the patient at a desired flow rate (typically no greater than the free flow rate that would occur through tubing without a pump cassette engaged). Typically, the pump cassette is adjustable to provide a flow rate that results in feeding the patient over a period of time that may be many minutes or many hours.

The feeding set can include one or more auxiliary clamps to squeeze the tubing closed so as to prevent free flow from the bag when the pump cassette is removed from engagement with the tubing.

It has been discovered that it would be desirable to provide an additional "back-up" way to prevent gravity free flow from the bag into the patient if the pump cassette is deliberately removed from the tubing or if the pump cassette fails or if the pump cassette is accidentally dislodged from engagement with the tubing. It has been discovered that a flexible, resilient, self-sealing, slit-type valve according to the present invention can be effectively employed to prevent such gravity free-flow.

When a self-sealing valve is employed as an anti-free flow valve, it must be able to maintain its closed condition against the maximum static head which would exist at the valve inlet when a full bag of formula is suspended above the valve without the pump cassette engaged with the tubing between the valve and the bag and without a shut-off clamp being properly engaged with the tubing between the valve and the bag. When the pump cassette is subsequently installed and engaged with the tubing to pump the fluid at a desired flow rate, the pump in the pump cassette must overcome the resiliency of the closed valve to open the valve so that the flow metered by the pump cassette is forced through the valve and into the patient.

It would be desirable for the valve to open at a pressure that is not too much greater than the static head pressure at the inlet of the valve so that the pumping power requirement can be minimized. If the pump is accidentally dislodged or purposely removed without installing an intervening clamp to shut off the tubing between the bag and the patient, then the open valve must close against the static head to prevent free-flow from the bag under the influence of gravity. Thus, the open valve must have sufficient resiliency to close against the static head.

For a given downstream pressure, a conventional flexible, self-sealing valve typically opens at a predetermined minimum upstream inlet pressure ("opening pressure"), but when open, closes only when the upstream inlet pressure is reduced to some value that is significantly less than the predetermined minimum upstream opening pressure. This difference between the upstream pressures at which the valve opens and closes must be taken into account to insure that (1) the pump cassette will be able to open the valve, and (2) the valve will be able to re-close if the pump cassette is removed and the open valve is subjected to the static head from the bag.

In order to minimize the energy requirement of the pump in the pump cassette, the inventor has discovered that it would be desirable to provide an improved flexible, self-sealing valve in which the valve closes when the pressure is close to (but still below) the minimum pressure at which the valve initially opens—it being understood that the maximum upstream pressure at which the valve is able to close (i.e., self-seal) is slightly less than the minimum upstream pressure at which the valve opens, and both the maximum closing pressure and the minimum opening pressure are each greater than the maximum static head pressure that would exist at the valve inlet if the pump cassette were disengaged from the tubing.

The inventor of the present invention has discovered that such an improved valve that opens and closes at pressures that are relatively close can be advantageously used in various applications, including, but not limited to, enteral feeding pumps, intravenous pumps, infusion sets, and other pump sets.

The inventor of the present invention has also determined that it would be particularly desirable to provide a valve having a relatively "crisp" opening and closing action (i.e., a quick and sure opening and closing operation) so as to minimize or limit fluid dripping or minor leakage.

SUMMARY OF THE INVENTION

The present invention provides an improved valve of the self-closing, flexible, resilient type, and the improved valve has an opening pressure differential across the valve that is close to the closing pressure differential across the valve so that such an improved valve can be effectively used in certain applications to provide improved operation in a fluid handling system. Further, the improved valve has a crisp opening and closing action which is advantageous in many applications.

The valve includes (a) a peripheral mounting portion; and (b) a valve head that is connected with the peripheral mounting portion and that is flexible and resilient. The valve head has a generally circular configuration relative to a longitudinal axis along which a fluent substance can be discharged from the valve head in a discharge flow direction. The valve head has an axially outward direction that is defined by the discharge flow direction. The valve head has an axially inward direction that is defined as the direction opposite to the axially outward direction. The valve head has (1) an interior side facing in the axially inward direction; (2) an exterior side facing in the axially outward direction; (3) at least one self-sealing slit through the valve head; and (4) confronting, openable portions along each slit to define a normally closed orifice. The openable portions are movable in the axially outward direction to an open orifice configuration to permit a discharge flow of a fluent substance.

An exterior surface is defined on the exterior side of the valve head. The exterior surface (a) can interface with the environment on the valve head exterior side, and (b) has a recessed configuration as viewed looking toward the exterior surface when the orifice is closed.

An interior surface defined on the interior side of the valve head. The interior surface (a) can interface with a fluent substance on the valve head interior side, and (b) has a recessed configuration as viewed looking toward the interior surface when the orifice is closed.

The thickness between the exterior surface and the interior surface is thinner at the center on the longitudinal axis than at a radially outward location.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same.

FIG. 3 is a plan view of the interior side of the first embodiment of the valve illustrated in FIGS. 1 and 2;

FIG. 4 is a side elevational view of the first embodiment of the valve show in FIGS. 1-3;

FIG. 16 shows the fourth embodiment of the valve in an as-molded unactuated, closed, rest configuration as viewed looking at the exterior side of the valve;

DESCRIPTION OF THE PREFERRED EMBODIMENTS

Figure 1:
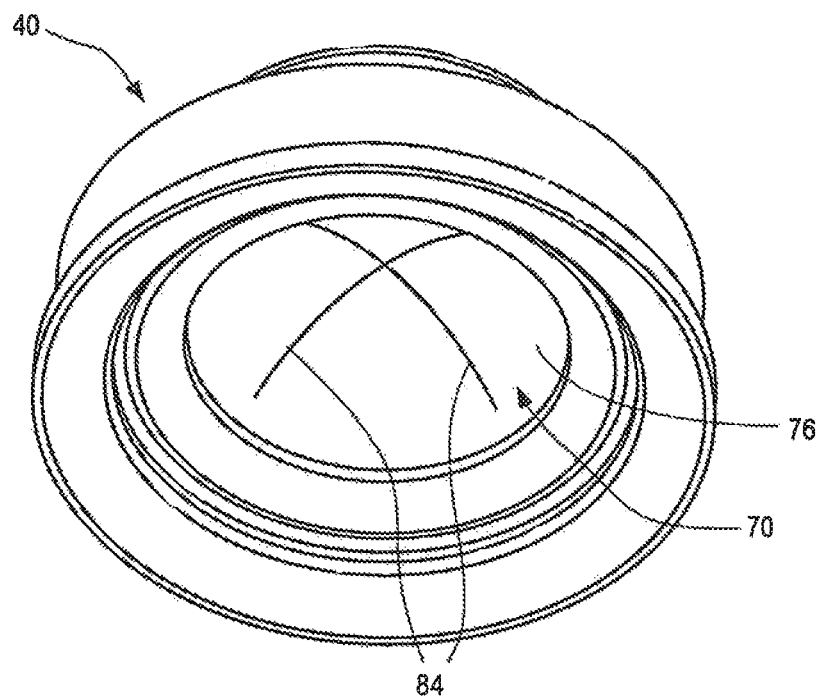
FIG. 1 is an isometric view of a first embodiment of a valve of the present invention, and the valve is shown in an as-molded, unactuated, closed, rest configuration as viewed looking at the exterior side of the valve.
Figure 2:
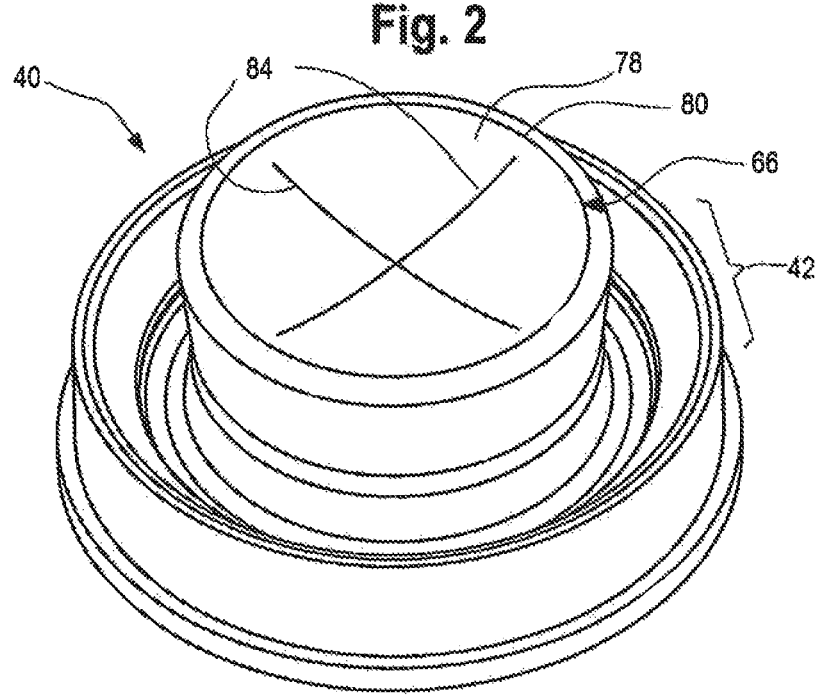
FIG. 2 is an isometric view of the first embodiment of the valve shown in FIG. 1, but in FIG. 2, the valve is viewed from the interior side rather than the exterior side as in FIG. 1.

While this invention is susceptible of embodiment in many different forms, this specification and the accompanying drawings disclose only some specific forms or embodiments as examples of the invention. The invention is not intended to be limited to the embodiments so described, however. The scope of the invention is pointed out in the appended claims.

As discussed in detail hereinafter, the valve of the present invention can be used as part of a fluid containment or handling system, including, but not limited to, an enteral feeding system, a container, or other dispensing structure so as to permit, prevent, control, or otherwise accommodate the transfer and/or flow of fluent substances.

For ease of description, many of the figures illustrating the valve show the valve in a "vertical" orientation, and terms such as upper, lower, horizontal, etc., are used with reference to this orientation. It will be understood, however, that the valve of this invention may be manufactured, stored, transported, sold, and used in an orientation other than the orientation described.

In the following description, two digit numbers are used to refer to the first embodiment illustrated in the FIGS. 1-7 and 7A, three digit numbers in the one hundred series are used to refer to the second embodiment illustrated in FIGS. 8-11, three digit numbers in the two hundred series are used to refer to the third embodiment illustrated in FIGS. 12-15, and three digit numbers in the three hundred series are used to refer to the fourth embodiment illustrated in FIGS. 16-22. The same last two digits in each number designate similar or functionally analogous elements in the various embodiments.

As used herein, the terms "interior" and "exterior" refer to opposite sides of the valve. In some applications, the valve may be installed in a system wherein both the interior side and exterior side are each connected (e.g., enclosed) in, or attached to, another component of the system. In such a case, the "interior" and "exterior" sides may be regarded as "first" and "second" sides, respectively, or vice versa, with the term "interior" referring to the side of the valve which is subjected to a greater pressure so that the fluent material flows through the valve from the interior side to the exterior side.

The valve of the present invention may be used with a variety of conventional or special fluent substance handling systems and/or holding systems, including medical tubing sets, glass or plastic bottles, flexible tubular containment structures, containers, tanks, vessels, and other equipment or apparatus, the details of which, although not fully illustrated or described, would be apparent to those having skill in the art and an understanding of such systems. The particular fluent substance handling or holding system, per se, forms no part of, and therefore is not intended to limit, the broad aspects of the present invention. It will also be understood by those of ordinary skill that novel and non-obvious inventive aspects are embodied in the described exemplary valve alone.

A first embodiment of the valve of the present invention is illustrated in FIGS. 1-7 and 7A and is designated generally by reference number 40 in many of those figures (e.g., in FIG. 1). The valve 40 is suitable for cooperation with mounting system components that can be provided and assembled with the valve 40. Such mounting components may be of any suitable special or conventional design, the details of which will be apparent to one of ordinary skill in the art and which form no part of the present invention.

The valve 40 is a self-closing, slit-type valve. The valve 40 is preferably molded as a unitary structure (i.e., one-piece structure) from material which is flexible, pliable, elastic, and resilient. This can include elastomers, such as a synthetic, thermosetting polymer, including silicone rubber, such as the silicone rubber sold by Dow Corning Corp. in the United States of America under the trade designation D.C. 99-595 and RBL-9595-40. Another suitable silicone rubber material is sold in the United States of America under the designation Wacker 3003-40 by Wacker Silicone Company. Both of these materials have a hardness rating of 40 Shore A. The valve 40 could also be molded from other thermosetting materials or from other elastomeric materials, or from thermoplastic polymers or thermoplastic elastomers, including those based upon materials such as thermoplastic propylene, ethylene, urethane, and styrene, including their halogenated counterparts. It is desirable in many applications that the material be substantially inert so as to avoid reaction with, and/or adulteration of, the fluent substance in contact with the valve.

Some prior art slit-type valves are disclosed in the U.S. Pat. Nos. 8,678,249 and 5,839,614, and in the international Patent Application Publication No. 2012/150937.

The valve 40 of the present invention has an initially closed, unactuated, substantially unstressed, rest position or configuration (FIGS. 1-7). The valve 40 can be forced to an "open" position or configuration (FIG. 7A) when a sufficiently high pressure differential acts across the valve 40 as described hereinafter.

With reference to FIGS. 2, 4, 6, and 7, the valve 40 has a peripheral mounting portion or flange 42. The flange 42 may have any suitable configuration for being mounted to, attached to, connected with, or for otherwise accommodating, a system in which the valve 40 is installed. The particular configuration of the flange 42 illustrated in FIGS. 1-7 and 7A may be characterized as having a generally dove-tail configuration when viewed in vertical cross section. Some other shapes of flange cross sections which could be employed with the valve 40 are illustrated in the U.S. Pat. No. 5,409,144. Typically, the flange 42 is clamped between opposing mounting components or structures to hold the valve 40 in a system, and such components or structures may be separate from, but attachable to, a portion or portions of the system, or alternatively, such mounting components or structures may be a unitary portion of the system. Preferably, the mounting flange 42 can be resiliently compressed so as to accommodate the creation of a secure leak-resistant seal when the valve flange 42 is compressively engaged by the mounting components or structures. In some applications, it may be desirable to configure the flange 42 for attachment to a system by means of adhesive, heat bonding, or other suitable means.

Figure 6:
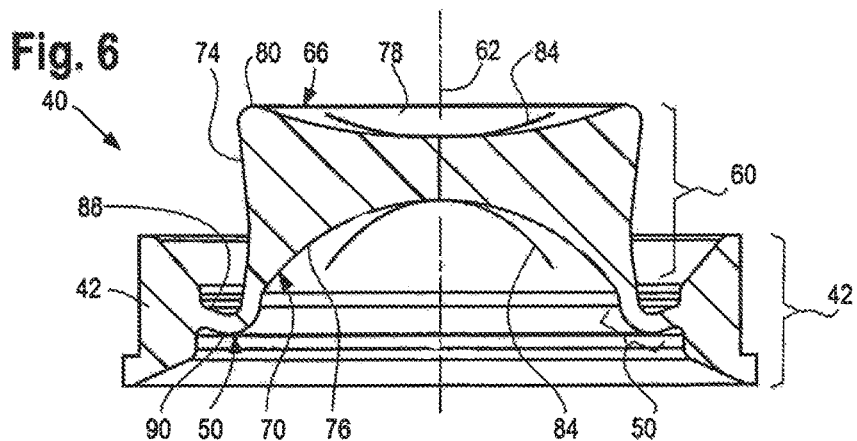
FIG. 6 is across-sectional view taken along the plane 6-6 in FIG. 3 of the first embodiment of the valve.
Figure 7:
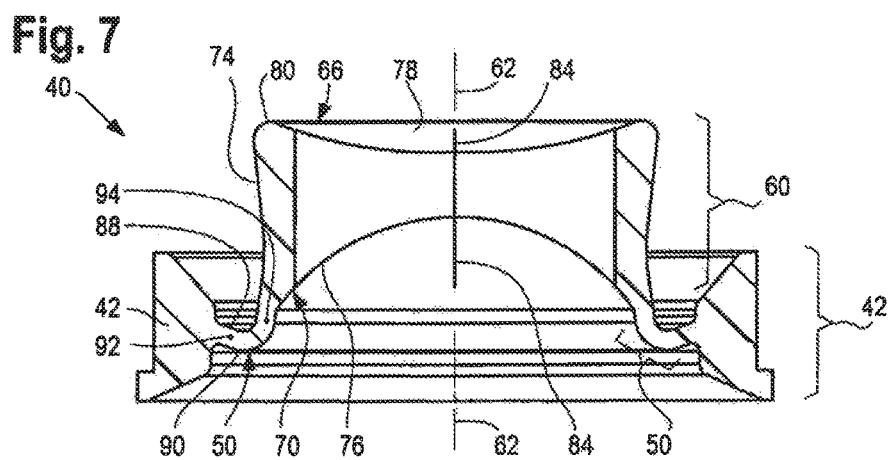
FIG. 7 is a cross-sectional view taken along the plane 7-7 in FIG. 3 of the first embodiment of the valve.
Figure 7A:
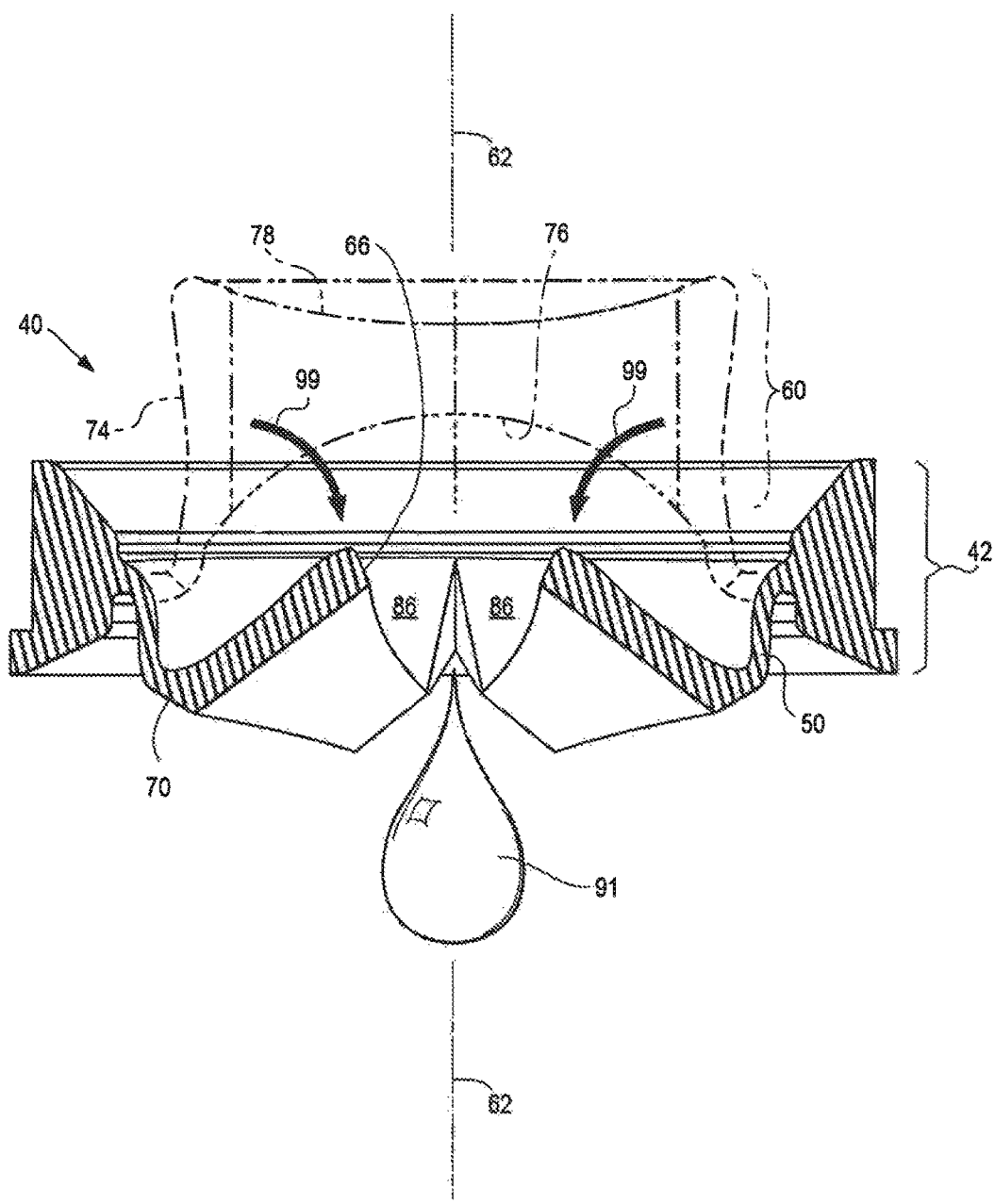
FIG. 7A is an enlarged cross-sectional view similar to FIG. 7 of the first embodiment of the valve, but FIG. 7A shows portions of the valve moved to an open position under influence of a pressure differential across the valve, and FIG. 7A also diagrammatically illustrates a drop of fluent material discharging from the valve.
Figure 8:
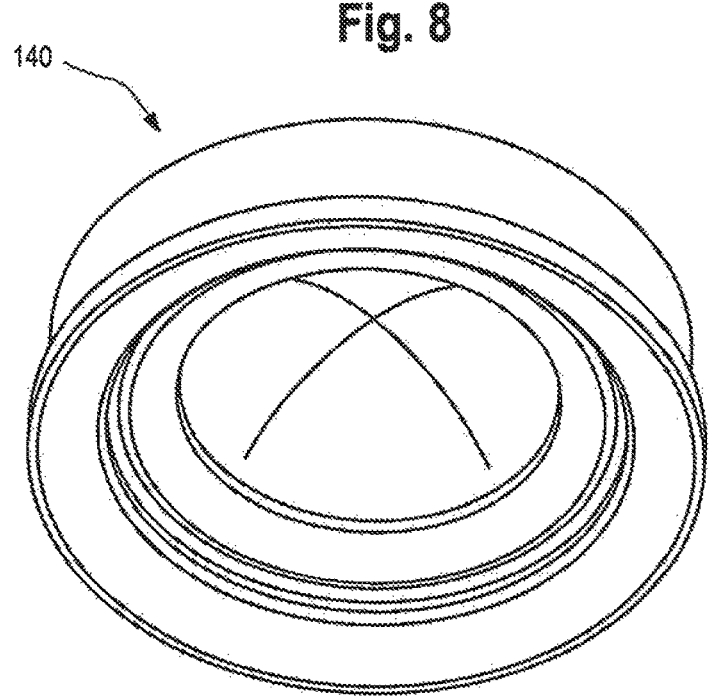
FIG. 8 is an isometric view of a second embodiment of a valve of the present invention, and the second embodiment of the valve is shown in an as-molded unactuated, closed, rest configuration as viewed looking at the exterior side of the valve.
Figure 9:
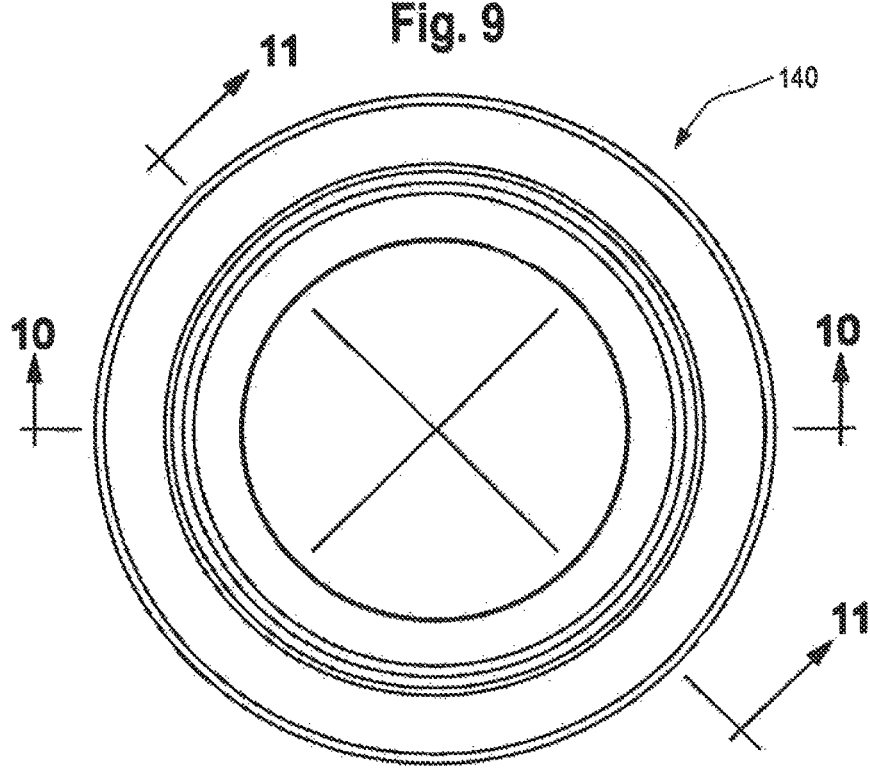
FIG. 9 is a plan view of the interior side of the second embodiment of the valve illustrated in FIG. 8.
Figure 10:
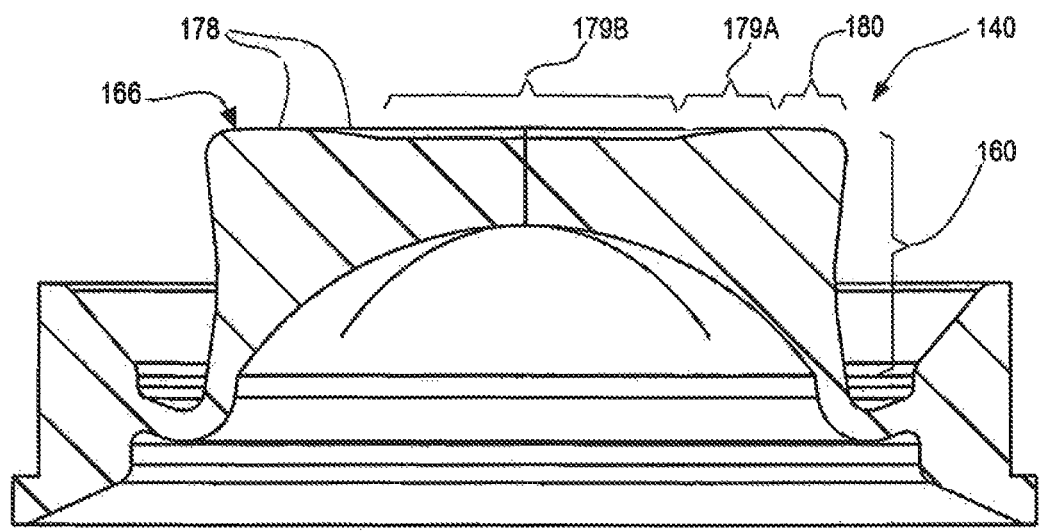
FIG. 10 is a cross-sectional view taken along the plane 10-10 in FIG. 9 of the second embodiment of the valve.
Figure 11:
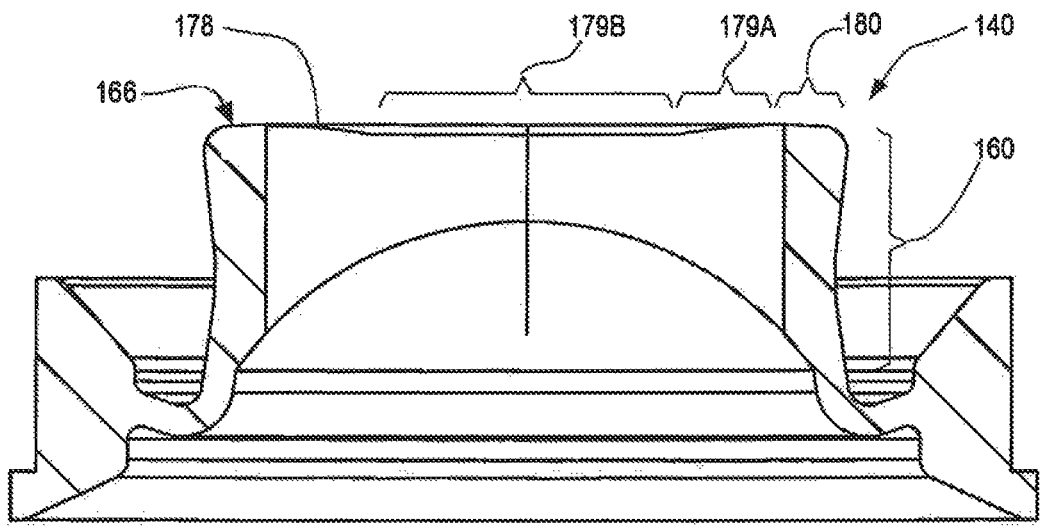
FIG. 11 is a cross-sectional view taken along the plane 11-11 in FIG. 9 of the second embodiment of the valve.

Extending generally radially inwardly from the flange 42 is the generally annular, intermediate portion or sleeve 50 (FIGS. 6 and 7) which connects the flange 42 to a valve head 60 (FIGS. 6 and 7). The valve head 60 is flexible and resilient. The valve head 60 has a generally circular configuration relative to a longitudinal axis 62 (FIGS. 6, 7, and 7A). The fluent substance can be dispensed or discharged in a discharge flow direction along the longitudinal axis 62 when the valve opens as shown in FIG. 7A.

The valve head 60 may be characterized as having an axially outward direction that is defined by the discharge flow direction, and the valve head 60 may be further characterized as having an axially inward direction that is defined as the direction opposite to the axially outward direction.

With reference to FIGS. 6 and 7, the valve 40 may be characterized as having an interior side 66 facing in the axially inward direction. With reference to FIGS. 6 and 7, the valve head 60 may be further characterized as having an exterior side 70 facing in the axially outward direction.

With reference to FIGS. 4, 6, and 7, the outer perimeter of the valve head 60 is preferably defined by a slightly tapered peripheral marginal surface 74 which begins at an axially inwardly peripheral corner of the valve head 60 and extends axially outwardly therefrom with a slightly radially inward taper which then changes to slightly radially outwardly taper, and which ultimately merges into the connector sleeve 50. The maximum outside diameter of the valve head 60 is smaller than the inside diameter of the marginal flange 42. The spacing between the valve head 60 and the marginal flange 42 permits, among other things, the valve head 60 to shift or move freely in an axial direction along the longitudinal axis 62 (FIGS. 6, 7, and 7A) from a fully retracted closed position (FIGS. 1-7) to an open position (FIG. 7A).

Figure 5:
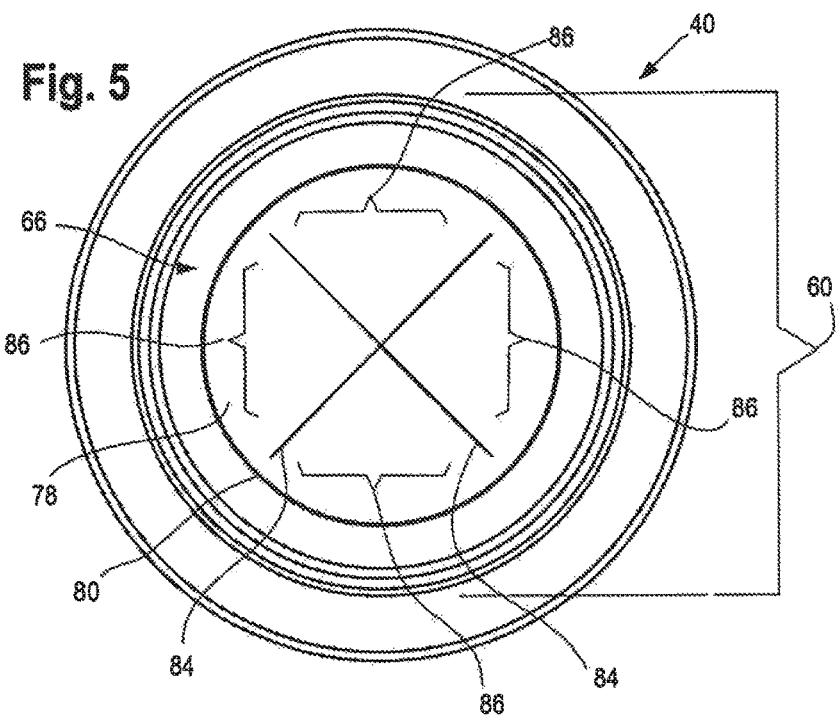
FIG. 5 is a plan view of the exterior side of the first embodiment of the valve shown in FIGS. 1-4.

The valve head exterior side 70 has an exterior surface 76 (FIGS. 6 and 7) which interfaces with the environment on the valve exterior side 70 and which has a recessed configuration as viewed looking toward the exterior surface 76 when the valve head 60 is in the fully retracted, closed position. The valve head interior side 66 has an interior surface 78 that can interface with a fluent substance on the valve head interior side 66. The interior surface 78 has an annular portion 80 that is located axially inwardly ("upwardly" as viewed in FIGS. 6 and 7) further than any other portion of the valve head 60 when the valve head 60 is in the fully retracted, closed position. In the first embodiment of the valve 60 illustrated in FIGS. 6 and 7, the maximum axially inward extent of the annular portion 80 is defined by a circular tangent line on the top, peripheral curved edge of the valve head 60. The circular tangent line of the portion 80 is also shown in FIG. 5. The portion of the interior surface 78 that is radially inside the annular portion 80 may be regarded as a central inner portion, and that central inner portion has a recessed configuration relative to the annular portion 80 as viewed looking toward the interior surface 78 when the valve head 60 is in the fully retracted, closed, position.

With reference to FIGS. 6 and 7, the valve head recessed central inner portion of the interior surface 78 (radially inwardly of the annular portion 80) lies on a partially spherical locus that defines a circular arc in longitudinal cross section as viewed along a plane containing the longitudinal axis 62.

Similarly, with reference to FIGS. 6 and 7, the valve head exterior surface 76 lies on a partially spherical locus that defines a circular arc in longitudinal cross section as viewed along a plane containing a longitudinal axis 62.

Further, in a preferred form of the first embodiment of the valve 40 illustrated in FIGS. 1-7 and 7A, the radius of the circular arc of the valve head exterior surface 76 is smaller (less) than the radius of the circular arc of the central inner portion of the valve head interior surface 78.

When the valve head 60 is viewed in cross section as illustrated in FIGS. 6 and 7, the valve head 60 has somewhat of an "hourglass" shape which is thicker at a radially outside portion of the valve head 60 and which is thinner at a radially inside portion of the valve head 60. This configuration assists in achieving a snap-open action of the valve to provide a "crisp" opening action and "crisp" closing action, and the inventor has also discovered that this configuration can minimize the difference between the pressure differential across the valve for opening the valve and the pressure differential across the valve for closing the valve.

With reference to FIG. 5, the valve head 40 has a normally closed orifice defined by a plurality of slits 84 radiating laterally or radially from the valve head longitudinal axis 62 (illustrated in FIGS. 6, 7, and 7A). The first embodiment of the valve 40 has four slits 84. A lesser or greater number of slits 84 could be used. The slits 84 extend transversely through the valve head 60 from the interior side 66 to the exterior side 76. Each slit 84 terminates in a radially outer end. In the illustrated preferred form of the first embodiment of the valve 40, the slits 84 are of equal length, although the slits could be of unequal length.

In the preferred form of the first embodiment of the valve 40, each slit 84 is planar and parallel to the central longitudinal axis 62 of the valve. Each slit 84 preferably defines a linear locus along the head exterior side surface 76 and along the head interior side surface 78. Preferably, the slits 84 diverge from an origin on the longitudinal axis 62 and define equal size angles between each pair of adjacent slits 84. Preferably, four slits 84 diverge at 90 degree angles to define two mutually perpendicular, intersecting, longer slits. In the preferred form of the valve 40, the four slits 84 may be alternatively characterized as being two longer intersecting slits oriented at equal angles of intersection. The length and location of the slits 84 can be adjusted to vary the predetermined opening pressure of the valve 40, as well as other dispensing characteristics.

The slits 84 define four, generally sector-shaped, equally sized flaps or petals 86 (FIG. 5) in the valve head 60. The flaps or petals 86 may be also characterized as "openable regions" or "openable portions" of the valve head 60. Each flap or petal 86 has a pair of diverging transverse faces defined by the slits 84, and each transverse face seals against a confronting transverse face of an adjacent petal 86 when the valve 40 is closed.

The valve 40 can be molded with the slits 84. Alternatively, the valve slits 84 can be subsequently cut into the central head 60 of the valve 40 by suitable conventional techniques. In operation, the petals 86 can be forced open outwardly (downwardly in FIG. 7A) from the intersection point of the slits 84 when a sufficient force is applied to the interior surface 78 of the valve head 60 (as by subjecting the valve head 60 to a pressure differential across the valve head 60).

The connector sleeve 50 is in the form of a rolling diaphragm, which, when the valve 40 is in the fully retracted, closed position (FIGS. 6 and 7), has a generally J-shaped cross-section defining an interior surface 88 and an exterior surface 90. When viewed in cross section, the connector sleeve 50 has a first leg 92 that is connected with the valve flange 42, and has a second leg 94 that is connected with the valve head 60.

The thickness of each leg 92 and 94 may vary, and the thickness of the first leg 92 may be the same as the thickness of the second leg 94. However, in the illustrated first embodiment of the valve 40, the first leg 92 and the second leg 94 are each of substantially uniform thickness.

In the preferred form of the first embodiment of the valve 40, the connector sleeve 50 locates the valve head 60 so that part of the valve head 60 projects axially inwardly beyond the marginal flange 42.

The connector sleeve 50 may also be characterized as having a short, arcuate junction portion between, and joining, the first leg 92 to the short second leg 94 as can be seen in FIGS. 6 and 7.

The sleeve 50 of the valve 40 is preferably configured for use in conjunction with a particular system, and a specific type of fluent substance, so as to achieve the flow characteristics desired. For example, the viscosity and density of the fluent substance are factors to be considered. The rigidity and durometer of the valve material, and size and thickness of portions of both the valve head 60 and the connector sleeve 50, are additional factors to be considered.

The valve 40 is suitable for use with flowable substances, such as liquids or even gases, powders, particulates, and granular material, as well as suspensions of solid particles in a liquid.

The valve 40 opens outwardly when the valve 140 is subjected to a sufficient pressure differential (i.e., a lower pressure on the exterior side of the valve head 60 than on the interior side of the valve head 60). The valve 40 could also accommodate in-venting by opening inwardly (when the lower pressure is on the interior).

The valve 40 could be opened outwardly by sucking on the exterior side of the valve or otherwise subjecting the valve exterior side to a reduced pressure. However, in many typical applications, it is contemplated that the valve 40 will be opened by subjecting the interior side of the valve head 60 to an increased pressure. In the following discussion, the operation of the valve 40 will be described with reference to such an increased interior pressure which is sufficient to open the valve outwardly into a lower ambient pressure environment. Further, the following discussion characterizes the full open condition as occurring in response to a predetermined minimum opening pressure. The predetermined minimum full opening pressure of the valve 40 may be varied widely in accordance with the flow criteria desired for a particular fluent substance.

In operation, the valve 40 functions in the following manner. The valve 40 normally assumes an initial, normally closed configuration illustrated in FIGS. 1-7, wherein the valve 40 remains substantially in its original molded shape without deformation (except perhaps at the flange 42 if the flange 42 is compressively engaged by mounting components). When the valve 40 is in the normally closed configuration, the connector sleeve 50 is substantially unstressed, the valve discharge orifice slits 84 are fully closed, and the valve head 60 is in a fully retracted position that is axially inwardly relative to the position that the valve head 60 will have when it is opened.

When a sufficient pressure differential is established across the valve head 60—such as when increased pressure is established on the valve interior side 66, the connector sleeve 50 begins to distort, and the valve head 60 begins to shift axially outwardly (downwardly in FIGS. 6, 7, and 7A).

As the interior side of the valve head 60 is subjected to additional pressure, the valve head 60 continues to move outwardly until the connector sleeve 50 is substantially fully extended, as illustrated in FIG. 7A. When the valve head 60 is in the substantially fully extended position (FIG. 7A), the connector sleeve 50 is highly stressed.

When the interior side of the valve head 60 is subjected to further increased pressure, the valve head 60, per se, continues to shift outwardly. However, because connector sleeve 50 is already substantially fully extended, further outward shifting of the valve head 60 longitudinally tensions or stretches the connector sleeve 50, thereby increasing the outwardly directed torque applied to the valve head 60. Also, the further outward movement of the valve head 60 tends to flatten or straighten the valve head 60, particularly along the exterior surface 76 thereof. This flattening motion tends to slightly enlarge or dilate the circular plan configuration of the valve head 60, which enlargement is in turn resisted by radially inwardly directed forces applied to the marginal surface 74 of the valve head 60 by the connector sleeve 54, thereby generating another complex pattern of stresses within the valve 40, and these include stresses which tend to compress the valve head 60 in a radially inward direction.

When additional pressure is applied to the interior side of the valve head 60, the valve head 60 continues to shift outwardly by further longitudinal stretching of the connector sleeve 50, and further enlargement of the plan shape of the valve head 60. The marginal portion of the valve head 60 is elastically deformed further inwardly, as a consequence of the increased torque forces applied thereto by the connector sleeve 50. These combined forces and motions also serve to further compress the valve head 60 into a state of bifurcation, wherein the combined forces acting on the valve head 60 will, upon application of any additional outward force on the valve head interior surface 78, cause the valve 40 to quickly open outwardly by separating the valve petals 86 in the manner illustrated in FIG. 7A with the directional arrows 99, and thereby dispense the fluent substance through discharge orifice. FIG. 7A shows a drop 91 of the fluent substance flowing through the valve 40.

The bifurcation state of the valve 40, as the term is used herein, defines a relatively unstable condition which the valve 40 assumes immediately prior to the valve petals 86 starting to open. As the valve 40 passes through the bifurcation state, the combined forces acting on the valve head 60 are in a temporary, unstable condition of equilibrium, and then the valve petals 86 quickly snap to create the open orifice (shown in sold lines in FIG. 7A).

It will be appreciated that while various theories and explanations have been set forth herein with respect to how forces and stresses may affect the novel operation of the valve of the present invention, there is no intention to be bound by such theories and explanations. Further it is intended that ale structures falling within the scope of the appended claims are not to be otherwise excluded from the scope of the claims merely because the operation of such valve structures may not be accounted for by the explanations and theories presented herein.

The valve 40 can also be designed to open inwardly when subjected to a sufficient differential pressure wherein the interior pressure is less than the exterior pressure by a predetermined amount. This would permit in-venting of ambient atmosphere through the valve to equalize the pressure—at which point the valve 40 would close.

The second embodiment of the valve of the present invention is illustrated in FIGS. 8-11 and is designated generally therein by the number 140. The second embodiment of the valve 140 is very similar to the first embodiment of the valve 40 described above with reference to FIGS. 1-7 and 7A, but the second embodiment of valve 140 differs with respect to the shape of the interior side 166 of the valve head 160. Specifically, the interior side 166 has an interior surface 178 that includes an annular portion 180 which has a width greater than the first embodiment valve interior surface annular portion 80. Further, the second embodiment valve head interior surface 178 has a central inner portion that is radially inwardly of the annular portion 180, and that central inner portion has a first sloping, annular surface or region 179A surrounding a flat, disc surface or region 179B. The surfaces 179A and 179B do not extend as deeply into the valve head as does the central inner portion of the interior surface 78 of the first embodiment valve head 60 (compare FIG. 6 with FIG. 10).

Figure 15:
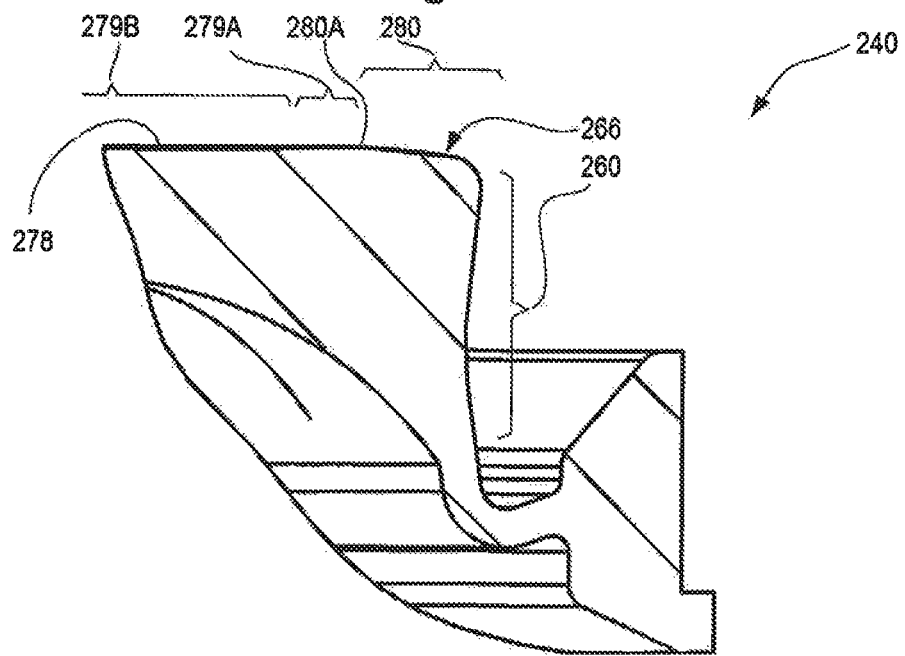
FIG. 15 is an enlarged, fragmentary, cross-sectional view of the portion of the structure enclosed within the circle designated "FIG. 15" in FIG. 13.
Figure 16:
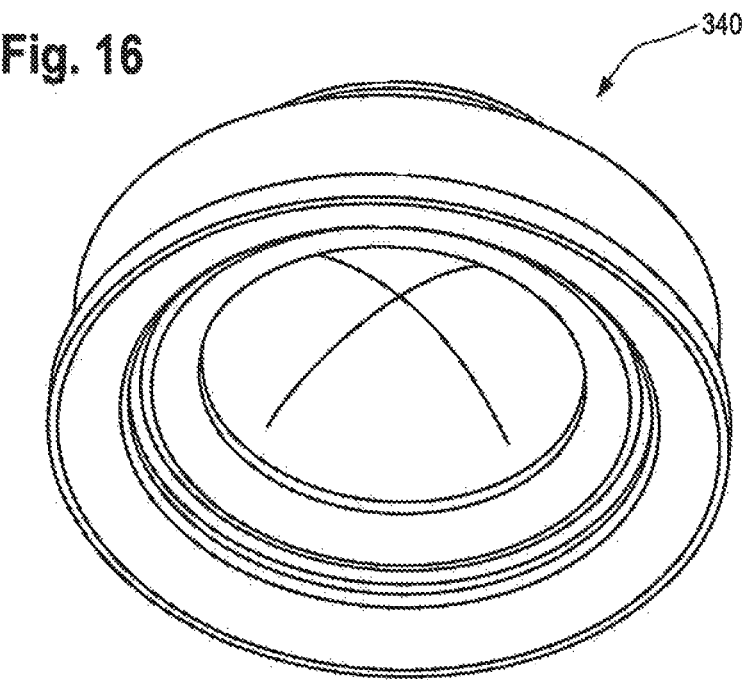
FIG. 16 is an isometric view of a fourth embodiment of a valve of the present invention.
Figure 17:
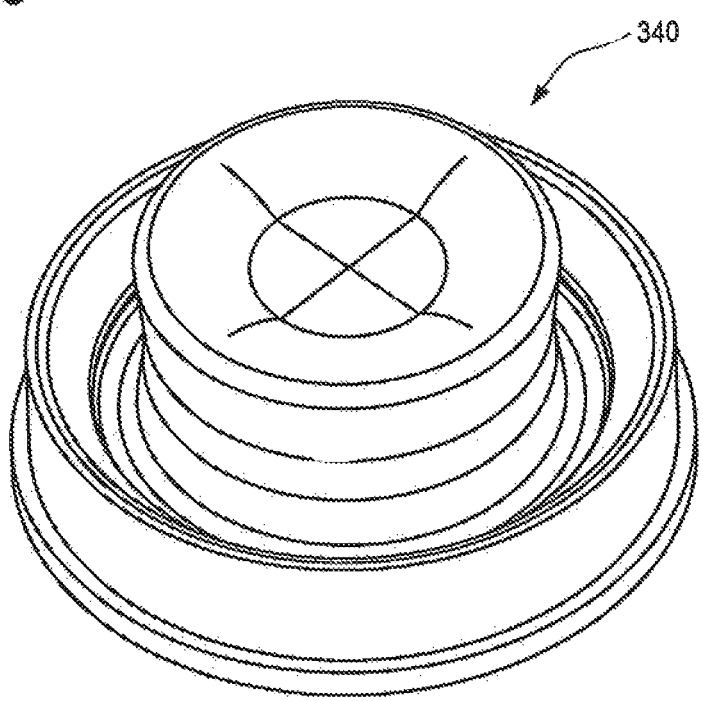
FIG. 17 is an isometric view of the fourth embodiment of the valve shown in FIG. 16, but in FIG. 17 the valve is viewed looking at the interior side rather than the exterior side as shown in FIG. 16.
Figure 18:
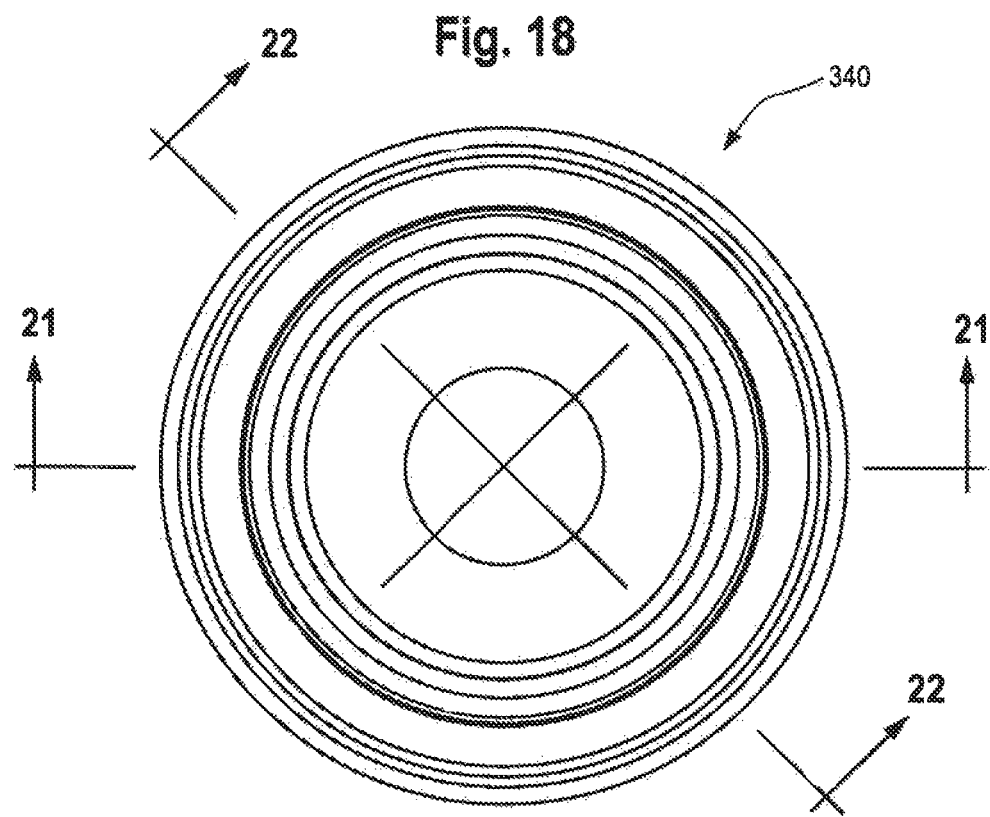
FIG. 18 is a plan view of the interior side of the fourth embodiment of the valve shown in FIGS. 16 and 17.
Figure 19:
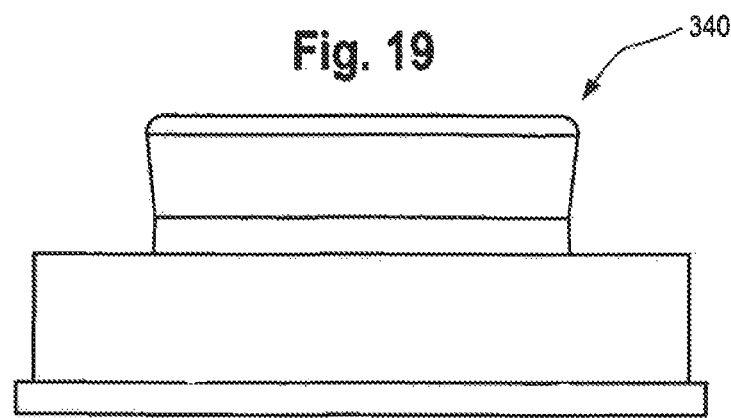
FIG. 19 is a side elevational view of the fourth embodiment of the valve shown in FIGS. 16-18.
Figure 20:
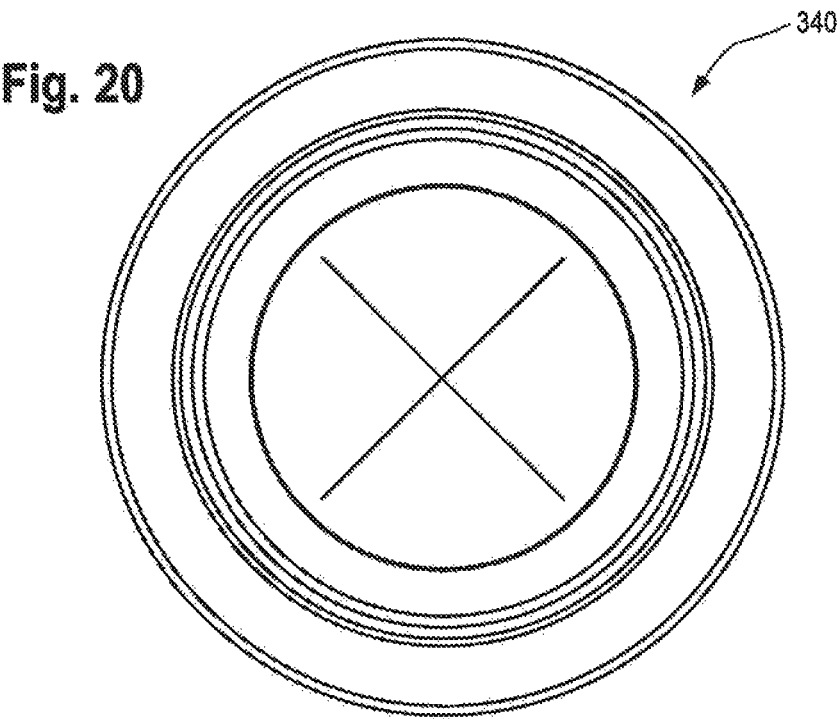
FIG. 20 is a plan view of the exterior side of the fourth embodiment of the valve shown in FIGS. 16-19.
Figure 21:
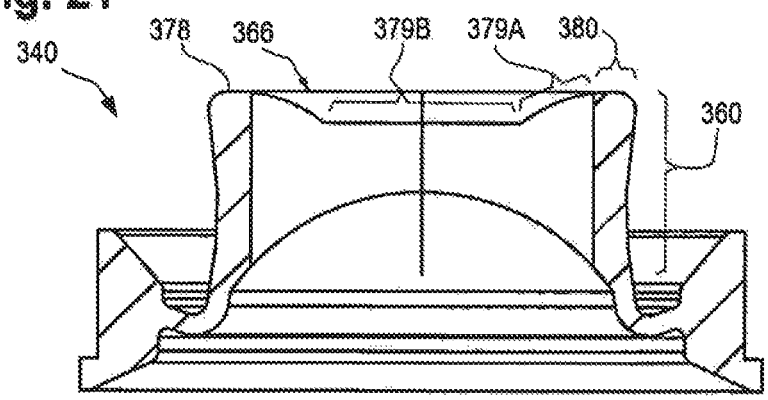
FIG. 21 is a cross-sectional view taken along the plane 21-21 in FIG. 18 of the fourth embodiment of the valve.
Figure 22:
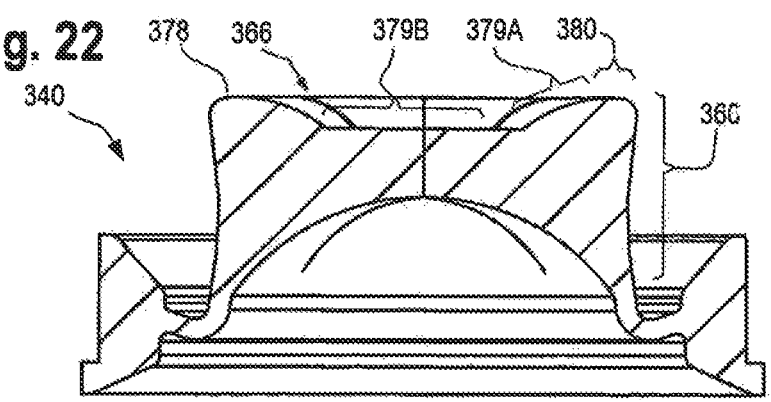
FIG. 22 is a cross-sectional view taken along the plane 22-22 in FIG. 18 of the fourth embodiment of the valve.

FIGS. 12-15 illustrate the third embodiment of the valve which is designated in FIGS. 12-15 generally by the number 240. The third embodiment valve 240 is similar to the second embodiment valve 140. However, the third embodiment valve 240 has a valve head 260 with an interior side 266 which defines an even more shallow recess compared to the recess portions 179A and 179B of the second embodiment valve of 140 illustrated in FIGS. 8-11 and discussed above. In particular, with reference to FIGS. 14 and 15, the third embodiment valve 240 defines an interior surface 278 that has a radially outer annular portion 280 which slopes away from a most axially inward circular tangent line 280A (FIG. 15). The circular tangent line 280A is located at, and defines, the axially most part of the valve head 260. The valve head interior surface 278 also has a central inner portion—located radially inwardly of the circular tangent line 280A and annular portion 280—that is defined by an annular sloping surface or region 279A around a generally flat recessed surface or region 279B.

Figure 12:
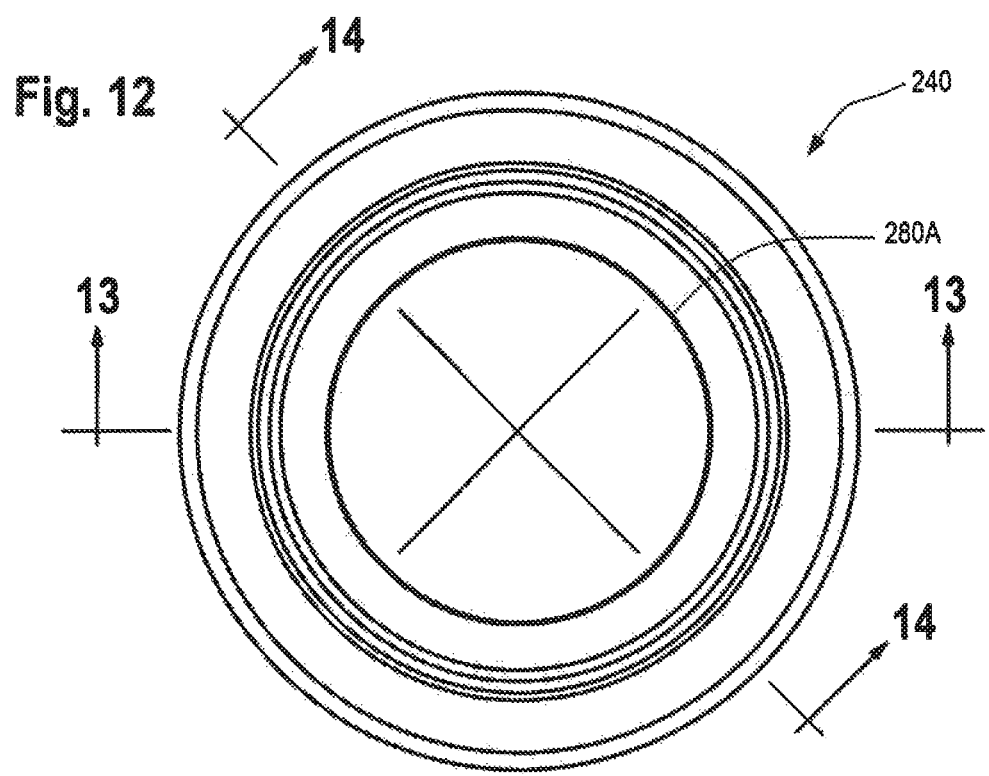
FIG. 12 is a plan view of the interior side of a third embodiment of the valve of the present invention shown in an as-molded, unactuated, closed, rest configuration.
Figure 13:
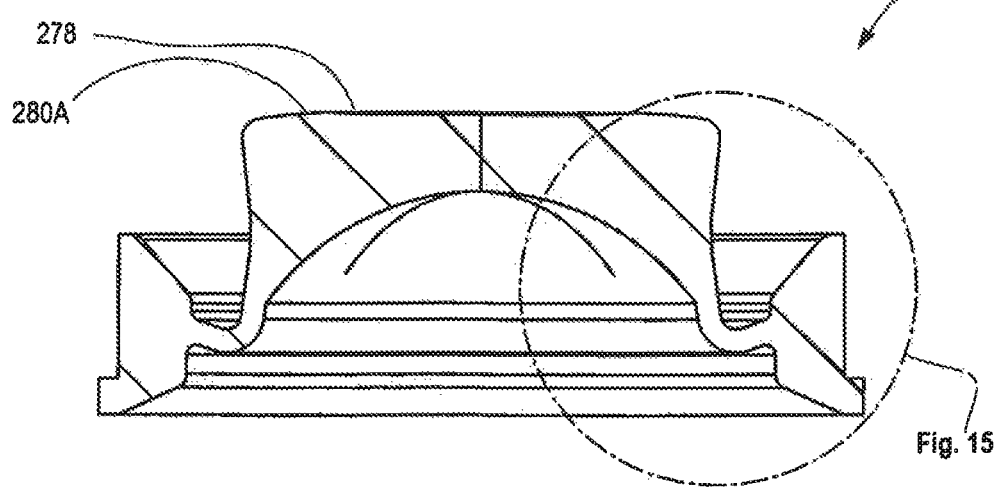
FIG. 13 is a cross-sectional view taken along the plane 13-13 in FIG. 12 of the third embodiment of the valve.
Figure 14:
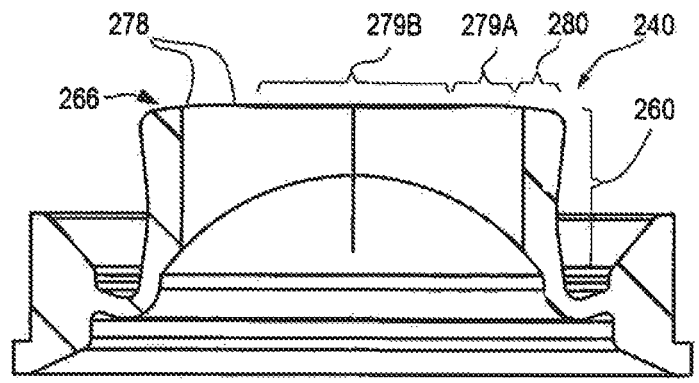
FIG. 14 is a cross-sectional view taken along the plane 14-14 in FIG. 12 of the third embodiment of the valve.

FIGS. 12, 13, and 15 present various dimensions for one preferred form of the third embodiment valve 240.

FIGS. 16-22 illustrate a fourth embodiment of the valve designated generally therein by the number 340. The fourth embodiment valve 340 is similar to the second embodiment of valve 140 discussed above with reference to FIGS. 8-11, but the fourth embodiment valve 340 has a valve head 360 with an interior side 366 defining an interior surface 378 having a more deeply recessed central inner portion defined by an annular sloping surface or region 379A surrounding a central, flat circular surface or region 379B. The surface 379B is recessed further into the valve head 360 than is the surface 179B in the second embodiment valve head 160 illustrated in FIG. 10.

The fourth embodiment valve head interior surface 378 includes a radially outer annular portion 380. The annular portion 380 surrounds the recessed central inner portions 379A and 379B. The annular portion 380 is located further axially inwardly than any other portion of the valve head 360.

In all four embodiments of the valve—valves 40, 140, 240, and 340—the recessed portion of the valve head interior surface and the recessed configuration of the valve head exterior surface provides a valve head with a thickness between the exterior surface and interior surface that is thinner at the center of longitudinal axis of the valve head than at a radially outward location. This configuration enables the valve to operate in a way that minimizes the pressure differential at which the valve opens compared to the pressure differential at which the valve closes. This is advantageous in various applications as discussed above.

The present invention can be summarized in the following statements or aspects numbered 1-13:

1. A valve comprising:
    (A) a peripheral mounting portion;
    (B) a valve head that is flexible and resilient, said valve head having a generally circular configuration relative to a longitudinal axis along which a fluent substance can be discharged from said valve head in a discharge flow direction, said valve head having an axially outward direction that is defined by said discharge flow direction, said valve head having an axially inward direction that is defined as the direction opposite to said axially outward direction, said valve head having
        (1) an interior side facing in said axially inward direction;
        (2) an exterior side facing in said axially outward direction;
        (3) at least one self-sealing slit through said valve head;
        (4) confronting, openable portions along the slit to define a normally closed orifice when said valve head is in a fully retracted, closed position that is axially inwardly of at least another part of said valve; said openable portions being movable in said axially outward direction to an open orifice configuration to permit a discharge flow of a fluent substance;
        (5) an exterior surface defined on said exterior side and which
            (a) can interface with the environment on the valve head exterior side, and
            (b) has a recessed configuration as viewed looking toward said exterior surface when said valve head is in the fully retracted, closed position;
        (6) an interior surface defined on said interior side and which
            (a) can interface with a fluent substance on the valve head interior side,
            (b) has an annular portion that is located axially inwardly further than any other portion of said valve head when said valve head is in the fully retracted, closed position, and
            (e) has a central inner portion that (i) is radially inside said annular portion, and (ii) has a recessed configuration relative to said annular portion as viewed looking toward said interior surface when said the valve head is in the fully retracted, closed position; and
        (7) a thickness between said exterior surface and said interior surface that is thinner at the center on the longitudinal axis than at the said interior surface annular portion; and
    (C) a connector sleeve that
        (1) is flexible and resilient;
        (2) defines a tubular shape over at least part of the sleeve length; and
        (3) extends between, and connects, said peripheral mounting portion and said valve head in a configuration that, when said valve is subjected to a sufficient pressure differential, doubles over and extends rollingly in said axially outward direction as said valve head moves from a fully retracted, closed position to an extended position that is axially outward of the fully retracted, closed position and that accommodates opening of said orifice.

2. The valve in accordance with aspect 1 in which
    said valve head orifice is defined by a pair of intersecting slits defining four of said openable portions;
    each said slit extends completely through the thickness of said valve head; and
    each said slit extends radially outwardly from the longitudinal axis.

3. The valve in accordance with any of the preceding aspects 1-2 in which said connector sleeve is defined at least in part by a tubular wall; and
    said tubular wall, as viewed in longitudinal cross section along a plane containing said longitudinal axis, has a generally J-shaped cross section when the valve is positioned so that said longitudinal axis is vertically oriented with said valve head up and with said peripheral mounting portion down.

4. The valve in accordance with any of the preceding aspects 1-3 in which said connector sleeve is defined by a generally tubular wall having a generally uniform cross section over at least part of its length.

5. The valve in accordance with any of the preceding aspects 1-4 in which said valve head exterior surface lies on a partially spherical locus that defines a circular arc in longitudinal cross section as viewed along a plane containing the longitudinal axis.

6. The valve in accordance with any of the preceding aspects 1-5 in which said valve head central inner portion is a partially spherical surface that defines a circular arc as viewed in longitudinal cross section along a plane containing said longitudinal axis.

7. The valve in accordance with aspect 6 in which
said valve head central inner portion circular arc has a radius; and
said valve head exterior surface lies on a partially spherical locus that (a) defines a circular arc in longitudinal cross section as viewed along a plane containing said longitudinal axis; and (b) has a radius that is smaller than the radius of said valve head central inner surface portion.

8. A valve comprising:
(A) a peripheral mounting portion; and
(B) a valve head that is connected with said peripheral mounting portion and that is flexible and resilient, said valve head having a generally circular configuration relative to a longitudinal axis along which a fluent substance can be discharged from said valve head in a discharge flow direction, said valve head having an axially outward direction that is defined by said discharge flow direction, said valve head having an axially inward direction that is defined as the direction opposite to said axially outward direction, said valve head having
(1) an interior side facing in said axially inward direction;
(2) an exterior side facing in said axially outward direction;
(3) at least one self-sealing slit through said valve head;
(4) confronting, openable portions along the slit to define a normally closed orifice; said openable portions being movable in said axially outward direction to an open orifice configuration to permit a discharge flow of a fluent substance;
(5) an exterior surface defined on said exterior side and which
 (a) can interface with the environment on the valve head exterior side, and
 (b) has a recessed configuration as viewed looking toward said exterior surface when said orifice is closed;
(6) an interior surface defined on said interior side and which
 (a) can interface with a fluent substance on the valve head interior side, and
 (b) has a recessed configuration as viewed looking toward said interior surface when said orifice is closed; and
(7) a thickness between said exterior surface and said interior surface that is thinner at the center on the longitudinal axis than at a radially outward location.

9. The valve in accordance with aspect 8 in which
said valve head orifice is defined by a pair of intersecting slits defining four of said openable portions;
each said slit extends completely through the thickness of said valve head; and
each said slit extends radially outwardly from the longitudinal axis.

10. The valve in accordance with any of the preceding aspects 8-9 in which
said valve head is connected to said peripheral mounting portion with a connector sleeve that
(1) is flexible and resilient;
(2) defines a tubular shape over at least part of the sleeve length; and
(3) extends between, and connects, said peripheral mounting portion and said valve head in a configuration that, when said valve is subjected to a sufficient pressure differential, doubles over and extends rollingly in said axially outward direction as said valve head moves from a fully retracted, closed position to an extended position that is axially outward of the fully retracted, closed position and that accommodates opening of said orifice;
wherein said connector sleeve is defined at last in part by a tubular wall; and
wherein said tubular wall, as viewed in longitudinal cross section along a plane containing said longitudinal axis, has a generally J-shaped cross section when the valve is positioned so that said longitudinal axis is vertically oriented with said valve head up and with said peripheral mounting portion down.

11. The valve in accordance with any of the preceding aspects 8-10 in which said valve head exterior surface lies on a partially spherical locus that defines a circular arc in longitudinal cross section as viewed along a plane containing the longitudinal axis.

12. The valve in accordance with any of the preceding aspects 8-11 in which said valve head interior surface includes a central inner portion that is a partially spherical surface that defines a circular arc as viewed in longitudinal cross section along a plane containing said longitudinal axis.

13. The valve in accordance with aspect 12 in which
said valve head central inner portion circular arc has a radius; and
said valve head exterior surface lies on a partially spherical locus that (a) defines a circular arc in longitudinal cross section as viewed along a plane containing said longitudinal axis; and (b) has a radius that is smaller than the radius of said valve head central inner portion.

It will be readily observed from the foregoing detailed description of the invention and from the illustrations thereof that numerous other variations and modifications may be effected without departing from the true spirit and scope of the novel concepts or principles of this invention.

What is claimed is:

1. A valve comprising:
(A) a peripheral mounting portion;
(B) a valve head that is flexible and resilient, said valve head having a generally circular configuration relative to a longitudinal axis along which a fluent substance can be discharged from said valve head in a discharge flow direction, said valve head having an axially outward direction that is defined by said discharge flow direction, said valve head having an axially inward direction that is defined as the direction opposite to said axially outward direction, said valve head having
(1) an interior side facing in said axially inward direction;
(2) an exterior side facing in said axially outward direction;
(3) at least one self-sealing slit through said valve head;
(4) confronting, openable portions along the slit to define a normally closed orifice when said valve head is in a fully retracted, closed position that is axially inward of at least another part of said valve; said openable portions being movable in said axially outward direction to an open orifice configuration to permit a discharge flow of a fluent substance;
(5) an exterior surface defined on said exterior side and which
 (a) can interface with the environment on the valve head exterior side, and
 (b) has a recessed configuration as viewed looking toward said exterior surface when said valve head is in the fully retracted, closed position;

(6) an interior surface defined on said interior side and which
  (a) can interface with a fluent substance on the valve head interior side,
  (b) has an annular portion that is located axially inward further than any other portion of said valve head when said valve head is in the fully retracted, closed position, and
  (c) has a central inner portion that (i) is radially inside said annular portion, and (ii) has a recessed configuration relative to said annular portion as viewed looking toward said interior surface when said valve head is in the fully retracted, closed position;
(7) a thickness between said exterior surface and said interior surface that is thinner at the center on the longitudinal axis than at the said interior surface annular portion; and
(8) an hourglass cross-sectional shape, as viewed in longitudinal cross section along a plane containing said longitudinal axis; and
(C) a connector sleeve that
  (1) is flexible and resilient;
  (2) defines a tubular shape over at least part of the sleeve length;
  (3) extends between, and connects, said peripheral mounting portion and said valve head in a configuration that, when said valve is subjected to a sufficient pressure differential, doubles over and extends rollingly in said axially outward direction as said valve head moves from a fully retracted, closed position to an extended position that is axially outward of the fully retracted, closed position and that accommodates opening of said orifice; and
  (4) overlies said annular portion of said valve head when said valve head is in the fully retracted, closed position.

2. The valve accordance with claim 1 in which
said valve head orifice is defined by a pair of intersecting slits defining four of said operable portions;
each said slit extends completely through the thickness of said valve head; and
each said slit extends radially outwardly from the longitudinal axis.

3. The valve in accordance with claim 1 in which
at least part of said connector sleeve has the form of a tubular wall; and
said tubular wall, as viewed in longitudinal cross section along a plane containing said longitudinal axis, has a generally J-shaped cross section when the valve is closed and positioned so that said longitudinal axis is vertically oriented with said valve head up and with said peripheral mounting portion down.

4. The valve in accordance with claim 1 in which said connector sleeve has the form of a generally tubular wall having a generally uniform cross section over at least part of its length.

5. The valve in accordance with claim 1 in which said valve head exterior surface lies on a partially spherical locus that defines a circular arc in longitudinal cross section as viewed along a plane containing the longitudinal axis.

6. A valve comprising:
(A) a peripheral mounting portion;
(B) a valve head that is flexible and resilient, said valve head having a generally circular configuration relative to a longitudinal axis along which a fluent substance can be discharged from said valve head in a discharge flow direction, said valve head having an axially outward direction that is defined by said discharge flow direction, said valve head having an axially inward direction that is defined as the direction opposite to said axially outward direction, said valve head having
  (1) an interior side facing in said axially inward direction;
  (2) an exterior side facing in said axially outward direction;
  (3) at least one self-sealing slit through said valve head;
  (4) confronting, openable portions along the slit to define a normally closed orifice when said valve head is in a fully retracted, closed position that is axially inward of at least another part of said valve; said openable portions being movable in said axially outward direction to an open orifice configuration to permit a discharge flow of a fluent substance;
  (5) an exterior surface defined on said exterior side and which
    (a) can interface with the environment on the valve head exterior side, and
    (b) has a recessed configuration as viewed looking toward said exterior surface when said valve head is in the fully retracted, closed position;
  (6) an interior surface defined on said interior side and which
    (a) can interface with a fluent substance on the valve head interior side,
    (b) has an annular portion that is located axially inward further than any other portion of said valve head when said valve head is in the fully retracted, closed position, and
    (c) has a central inner portion that (i) is radially inside said annular portion, and (ii) has a recessed configuration relative to said annular portion as viewed looking toward said interior surface when said valve head is in the fully retracted, closed position; and
  (7) a thickness between said exterior surface and said interior surface that is thinner at the center on the longitudinal axis than at the said interior surface annular portion; and
(C) a connector sleeve that
  (1) is flexible and resilient;
  (2) defines a tubular shape over at least part of the sleeve length;
  (3) extends between, and connects, said peripheral mounting portion and said valve head in a configuration that, when said valve is subjected to a sufficient pressure differential, doubles over and extends rollingly in said axially outward direction as said valve head moves from a fully retracted, closed position to an extended position that is axially outward of the fully retracted, closed position and that accommodates opening of said orifice; and
  (4) overlies said annular portion of said valve head when said valve head is in the fully retracted, closed position:
and wherein said valve head central inner portion is a partially spherical surface that defines a circular arc as viewed in longitudinal cross section along a plane containing said longitudinal axis.

7. The valve in accordance with claim 6 in which
said valve head central inner portion circular arc has a radius; and
said valve head exterior surface lies on a partially spherical locus that (a) defines a circular arc in longitudinal cross section as viewed along a plane containing said longitudinal axis; and (b) has a radius that is smaller than the radius of said valve head central inner portion.

* * * * *